United States Patent [19]

Murakami et al.

[11] Patent Number: 4,512,006
[45] Date of Patent: Apr. 16, 1985

[54] OPTICAL TYPE INFORMATION READ/WRITE APPARATUS

[75] Inventors: Teruo Murakami; Isao Hoshino, both of Yokohama, Japan

[73] Assignee: Tokyo Shibaura Denki Kabushiki Kaisha, Kawasaki, Japan

[21] Appl. No.: 421,731

[22] Filed: Sep. 23, 1982

[30] Foreign Application Priority Data

Nov. 16, 1981 [JP] Japan .................................. 56-183268

[51] Int. Cl.³ ............................................. H04N 5/76
[52] U.S. Cl. ........................................ 369/50; 369/59; 369/128; 369/133; 369/240
[58] Field of Search .................. 358/342, 340; 360/48, 360/49, 53; 369/50, 59, 109, 128, 133, 240

[56] References Cited

U.S. PATENT DOCUMENTS

| 4,142,209 | 2/1979 | Hedlung et al. | |
| 4,308,557 | 12/1981 | Dieterich | 369/59 X |
| 4,309,721 | 1/1982 | Christopher | 369/59 X |
| 4,338,683 | 7/1982 | Furukawa et al. | 369/50 |

FOREIGN PATENT DOCUMENTS 0037487 10/1981 European Pat. Off. .

OTHER PUBLICATIONS

Optical Engineering, vol. 20, No. 3, May–Jun. 1981, pp. 399–403, Bellingham, WA (U.S.A.), J. W. Watkins et al.
IEEE Spectrum, vol. 16, No. 2, Feb. 1979, pp. 33–38, N.Y. (U.S.A.), G. C. Kenney et al.: "An Optical Disk Replaces 25 Mag Tapes".
SPIE, vol. 177, Optical Information Storage, (1979), pp. 135–147, Bellingham, WA (U.S.A.), C. W. Reno et al.
Patents Abstracts of Japan, vol. 4, No. 189(E-39)[671], 25th Dec. 1980; and JP A No. 55 132 154.
Development of an Optical Disc Recorder, Quarterly Technical Report; "Disc Data Formating Employing Soft Sectoring", by Ray Hunt, Jul. 1–Sep. 30, 1976.

Primary Examiner—Robert L. Richardson
Attorney, Agent, or Firm—Oblon, Fisher, Spivak, McClelland & Maier

[57] ABSTRACT

An optical-disk system is disclosed which comprises an optical-disk rotating in accordance with constant linear velocity technique, a signal input device for producing an information signal digitally encoded, and address generator for generating an address signal, an interleave circuit for commonly leaving both the information signal and the address signal, and a write controller for modulating a write beam incident to the optical-disk in response to the output signal from the interleave circuit and for forming at least one sector including both the commonly interleaved signals on the optical-disk.

19 Claims, 7 Drawing Figures

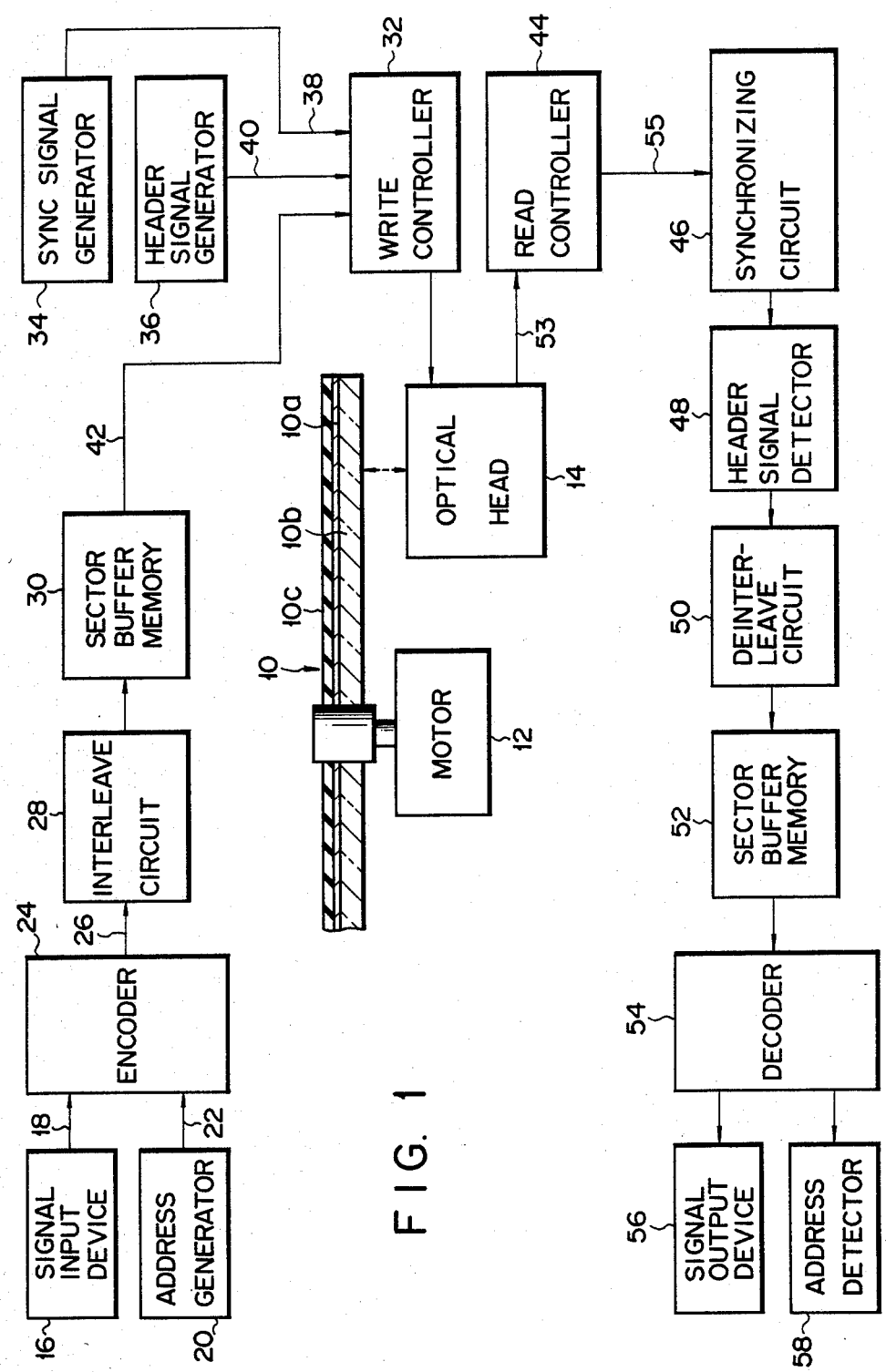
F I G. 1

OPTICAL TYPE INFORMATION READ/WRITE APPARATUS

BACKGROUND OF THE INVENTION

The present invention relates to an apparatus for storing information on a recording medium by employing a beam of energy such as a laser beam and, more particularly, to an optical type information read/write apparatus for defining sectors for sequentially storing information units on an optical-disk by using a laser beam and retrieving the information units at a sector unit.

An information record/reproduction (read/write) apparatus which employs a recording medium for storing a relatively large capacity of information on a magnetic disk is heretofore known. According to this magnetic information read/write apparatus, in order to enable retrieval of desired units of information stored on the disk at a high speed, coded information is divided into a plurality of recording units each having a predetermined number of bits, i.e., sectors, and is read/written on a magnetic disk per sector unit. The information is organized in an orderly fashion on such a system by tracks and sectors. Each sector includes, in addition to the information unit written by itself, address data indicating an address on the disk of the sector, header data indicating the starting point of the address data and synchronizing signal data. Accordingly, when a sector address is designated, desired one of information units can be retrieved and read fairly readily at a high speed.

However, recording media for storing a further large capacity of information in a high density format has recently been required due to the progress of modern information processing techniques. This requirement has not been sufficiently satisfied by the conventional magnetic disk system.

An optical-disk can be listed as one of the recording media which can satisfy the above-described requirement. A so-called optical-disk system which performs the read/write operations by using an optical-disk for storing a large capacity of information in a high density format has been noted. According to an ordinary optical-disk system, a write laser beam is converged to a spot having a predetermined diameter such as, for example, approx. 1 $\mu$m, and this spot-shaped laser beam is emitted to form a pit having approx. 0.6 $\mu$m to 1 $\mu$m in width and approx. 1 $\mu$m to 2 $\mu$m in length on the optical-disk, thereby recording the information. The information thus stored on the optical-disk is read by emitting a read laser beam smaller than the energy power of the write laser beam to the optical-disk.

When information is read and written in accordance with a sectoring technique for applying the optical-disk system thus constructed to the magnetic disk system, there occurs a problem such that, when a desired sector is retrieved or accessed at the reading time, the access error occurrence rate is undesirably increased. The reasons for the above problem will now be described. Since the magnetic disk has relatively large unit information size (e.g., approx. 5 $\mu$m to 10 $\mu$m of unit information length in a track direction and approx. 100 $\mu$m to 200 $\mu$m of unit information width in the radial direction of the disk), the access error occurrence rate caused by the magnetic disk itself remains approx. $10^{-9}$. Thus, even with the information stored on the disk in accordance with the above-described sectoring technique, the access error occurrence rate can be maintained actually within an allowable range. On the other hand, the size of the pit formed on the disk is extremely small in the optical-disk system as described above. Accordingly, an ultrafine or otherwise insignificant defect such as extremely small pieces of dust adhering to the optical-disk and/or ultrafine scratches produced on the optical-disk might cause a definite access error. As a consequence, the access error occurrence rate of the disk itself in the optical-disk system is increased to approx. $10^{-4}$ to $10^{-5}$. It is impossible with such large error occurrence rate to perform the effective retrieval or access of one desired information unit from a number of information units stored on the optical-disk in accordance with the sectoring technique.

It was reported, for example, in the 1981 meeting of the Institute of Electronics and Communication Engineering of Japan, 1166, Apr. 1-3, 1981, by the inventors of the present invention in a paper entitled "Discussion of error-correction system adapted for optical-disk memory", that there was a possibility of occurring not only "random defects" of micrometer order in size but so-called "burst defects" of larger than 100 $\mu$m in size on the optical-disk manufactured in an ordinary state. Accordingly, the elimination of this problem so as to perform the efficient access of the information of the optical-disk system in accordance with the above-described sectoring system has been eagerly awaited, especially since the address data error was occurred in the sector due to these defects and the access error rate of the optical-disk system was considerably higher than the magnetic disk system.

Also according to the optical-disk system, the optical-disk was rotatably controlled, so as to improve the common storing capacity, in accordance with the constant linear velocity (CLV) technique. The rotation of the optical-disk is controlled in this case such that the relative velocity between a laser head and the disk is maintained substantially constant. In this case, the sectors formed on the disk have equal circular-arc-shaped sector lengths. As a result, the number of sectors contained in each track of the optical-disk depend upon the different tracks, and since the starting and ending positions of the sectors contained in the tracks are different from each other, they become irregular. This caused further undesirable deterioration in the access error occurrence rate in the optical-disk system. When such problems are eliminated in the hardware and in a system configuration of the optical-disk system, the structure of the optical-disk system becomes undesirably complicated.

SUMMARY OF THE INVENTION

It is an object of the present invention to provide a new and improved optical type information read/write apparatus for storing a large amount of information in a high density format in accordance with a sectoring technique and for retrieving or accessing a desired sector or sectors at high speed.

In one embodiment of the optical information storing apparatus according to the present invention, information is stored in a sector unit for each information unit on a disk-shaped recording medium having a radiation-sensitive layer. A plurality of information units are respectively stored in the sectors formed by optical means on a recording medium together with at least a data for specifying an address. A first circuit is provided to produce a digitally coded information signal from at least one information unit contained in the information in accordance with a known PCM format. The address signal is produced from a second circuit. A third circuit for simultaneously interleaving both the information signal and the address signal is connected to the first and second circuits. This third circuit serves to produce an interleaved output signal which includes the above two signals, and this output signal is supplied to a fourth circuit connected to the third circuit. This fourth circuit serves to modulate a write beam of energy incident to the radiation-sensitive layer of the recording medium in response to the above output signal so as to form at least one sector which includes the interleaved output signal on the radiation-sensitive layer of the recording medium.

BRIEF DESCRIPTION OF THE DRAWINGS

The present invention is best understood by reference to the accompanying drawings, in which:

FIG. 1 is a block diagram schematically showing the structure of an optical type information read/write apparatus (optical-disk system) according to an embodiment of the present invention;

DETAILED DESCRIPTION OF THE PREFERRED EMBODIMENTS

Figure 2:
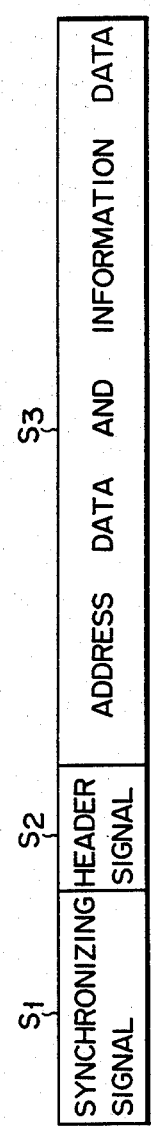
FIG. 2 is a sector data format diagram showing a model of the structure of one sector formed on the optical-disk of the optical-disk system in FIG. 1.

Referring now to FIG. 1, there is illustrated an optical type information read/write apparatus constructed according to an embodiment of the present invention. An optical-disk 10 has a radiation sensitive layer 10$a$ on which information is writable and readable, transparent substrate 10$b$ which supports the radiation sensitive layer or recording layer 10$a$, and protection layer 10$c$. The recording layer 10$a$ is sandwiched between the substrate 10$b$ and the protection layer 10$c$. The optical-disk 10 serving as information-storing medium is rotatably driven by a DC motor 12. An optical head section 14 includes a known laser oscillator (not shown) such as a semiconductor laser element, and a lens system, and converges a laser beam oscillated from a directly modulatable semiconductor laser device as a spot having a predetermined diameter on the optical-disk 10 to store/retrieve or access the information. Since the disk 10 is rotatably controlled in accordance with the constant linear velocity (CLV) technique during this period of time, the relative velocity between the rotating disk 10 and the optical head 14 can be maintained substantially constant. In other words, assume that the distance from the center of the disk 10 is represented by $\gamma$, and the rotating speed of the disk 10 is represented by $\omega$, the following equation can be set:

$$2\pi\gamma\omega = \text{constant.}$$

In a write mode, a signal input device 16 converts analog to digital information in accordance with a pulse code modulation (PCM) format known by those skilled in the art, and produces a digitally coded information signal 18. At this time the analog information is made digital for each information unit. An address generator 20 produces an address signal 22 for respectively defining the above information units. The information signal 18 and address signal 22 are supplied to an encoder 24, which in turn corrects the error of and encodes both the signals 18 and 22. According to the error-correction-encoding processes in the encoder 24, m bits of inspection bits are produced in accordance with a predetermined processing method for k bits of input signal supplied to the encoder 24, and the inspection bits are added to the input signal to provide a redundancy. Thus, a code word corresponding to the information unit having n(=k+m) bits of code length is produced. When the above-described encoding process of the encoder 24 is executed, a code error produced at a predetermined bit (A bit) at an arbitrary position can be detected by checking a different pattern in accordance with the above-described encoding process when accessing the information unit stored on the optical-disk 10, and the code error can be corrected. The above-described encoding process on the basis of the error-correction technique is known by those skilled in the art, and a Hamming encoding method, a BHC encoding method, etc. are, for example, known. The error correcting capacity of the encoder 24 is expressed by the error detectable bit number A.

An error-correction encoded signal 26 produced from the encoder 24 is supplied to an interleave circuit 28. The interleave circuit 28 serves to interleave both the information signal and address signal which are encoded by the encoder 24 for error-correction. The interleave circuit 28 interleaves the signals with a predetermined word or the code word of 1 word as a unit. The information signal and address signal thus interleaved by the interleave circuit 28 are temporarily stored in a sector buffer memory 30 provided at and output stage of the interleave circuit 28.

The sector buffer memory 30 is connected to a write controller 32. Further, a synchronizing signal generator 34 and a header signal generator 36 are connected to the write controller 32. The synchronizing signal generator 34 produces a synchronizing signal 38, and the header signal generator 36 produces a header signal 40. These signals 38 and 40 are supplied to the write controller 32. At this time an encoded signal, having both the information signal and address signal which are stored in the memory 30 subsequent to the signals 38 and 40 and which are encoded for error-correction (error-correcting code encoded), is read from the sector buffer memory 30 and is supplied to the write controller 32. The write controller 32 combines the synchronizing signal 38, header signal 40 and a signal 42, which includes the address signal and information signal (information unit) commonly interleaved, to form a sector to be written on the optical-disk 10. The sector structure thus obtained is shown in model in FIG. 2. In FIG. 2, a sector section $S_1$ is a data field for storing the synchronizing signal 38, a sector section $S_2$ is a data field for storing the header signal 40, and a sector section $S_3$ is a data field for storing a set of the address signal and information signal thus encoded for error-correction and then interleaved. In other words, the write controller 32 serves to modulate a laser beam radiated from a semiconductor laser oscillator included in the head section 14 and emitted to the recording layer 10$a$ of the rotating disk 10 in accordance with the signals 38, 40 and 42. Thus, the information units are stored by sector units on the recording layer 10a of the optical-disk 10 together with the synchronizing signal, header signal and address signal. As described above, the optical-disk 10 is rotatably controlled in accordance with the CLV control technique. Accordingly, when a number of information units are written in the optical-disk 10 in the same manner as described above, a number of sectors, which are formed on the rotating disk 10 and store the information units respectively, have sector lengths substantially equal to each other irrespective of the position or different sector circular-arc angles in the different tracks on the disk 10. Thus, the information is optically stored in the format of a so-called "pit train" in a sector unit on the optical-disk 10.

The head section 14 is connected to a read-out processor or read controller 44. The read controller 44 is connected to a sector buffer memory 52 through a synchronizing circuit 46, a header signal detector 48 and a deinterleave circuit 50. In the reproduction or read mode, a reproduction signal 53 which is read out by the optical head 14 in a sector unit from the optical-disk 10 by the known method and converted into an electrical signal is demodulated by the read controller 44. The demodulation signal 55 is synchronized by the synchronizing circuit 46, and is sequentially headed by detecting the header signal included in the sector thus read out by the header signal detector 48. Thereafter, the demodulation signal 55 is deinterleaved by the deinterleave circuit 50, and is then stored in the sector buffer memory 52. The signal thus stored in the sector buffer memory 52 is error-detected and corrected by a decoder 54, the information signal included in the sector thus read out is isolated from the address signal similarly included in the sector, and is then supplied to a signal output device 56. The isolated address signal is supplied to an address detector 58.

Figure 3A:
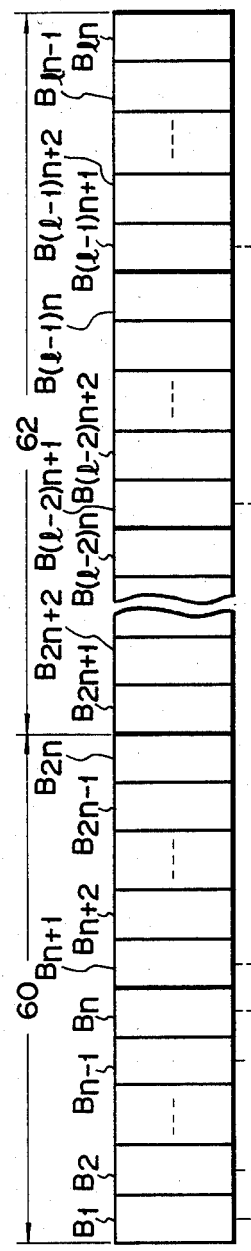
FIGS. 3A to 3C are diagrams for describing an interleaving technique or method employed in the optical-disk system in FIG. 1.

The error correction code encoding and interleaving techniques of the address signal and information signal in the apparatus of FIG. 1 will now be described in more detail with reference to FIGS. 3A to 3C. FIG. 3A illustrates the signal structures of the address signal and information signal outputted from the encoder 24 in FIG. 1 and corresponding to those for one sector. The signal structure in FIG. 3A has an address signal field 60 encoded for error-correction by the encoder 24 and an information signal field 62 similarly encoded for error-correction. The address signal field 60 include a plurality of code words each having n bits of code length. In FIG. 3A, the address signal field 60 includes two code words, for illustration purposes only. Accordingly, the data bits B forming the code words included in these address signal field 60 are sequentially represented by $B_1, B_2, \ldots, B_{n-1}, B_n, B_{n+1}, B_{n+2}, \ldots, B_{2n-1}, B_{2n}$. On the other hand, the information signal field 62 also includes a plurality of code words (l−2 pieces in FIG. 3A) each having n bits. The data bits forming the code words included in the information signal field 62 are represented by $B_{2n+1}, B_{2n+2}, \ldots, B_{(l-2)n}, B_{(l-2)n+1}, B_{(l-2)+2}, \ldots, B_{(L-1)n}, B_{(l-1)n+1}, \ldots, B_{ln-1}, B_{ln}$.

Figure 3B:
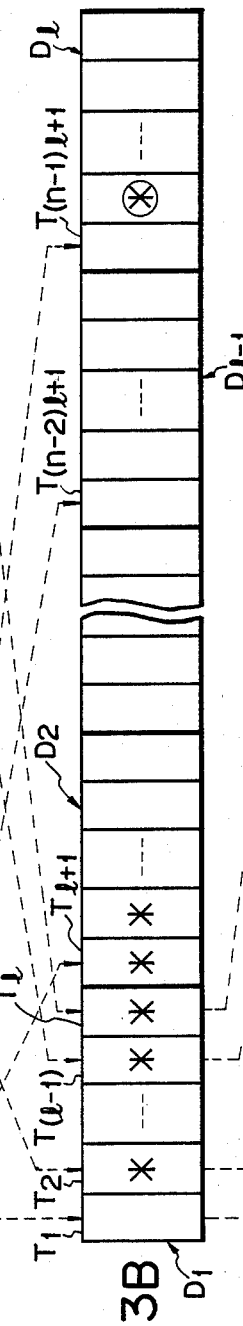

When an interleaving process is executed with the code word of l word as a unit in the interleave circuit 28 in FIG. 1 as described above, a signal structure to be stored in the optical-disk 10 as shown in FIG. 3B can be obtained. In other words, the address signal and information signal included in the same sector are interleaved together as a signal train. More particularly, since the signal structure in FIG. 3A includes l pieces of data blocks each having n bits, the array is converted by the execution of the above interleaving process to an array such that the first bit data of every data block in FIG. 3A are sequentially included in the first new data block $D_1$ of l pieces of new data blocks $D_1, D_2, \ldots, D_{l-1}, D_l$ forming the signal structure in FIG. 3B. In this manner, the bit data $T_1, T_2, \ldots, T_{l-1}, T_l$ forming the first new data block $D_1$ l of the signal structure in FIG. 3B correspond to the bit data $B_1, B_{n+1}, \ldots, B_{(l-2)n+1}, B_{(l-1)n+1}$ in FIG. 3A. Similarly, the second bit data $B_2, B_{n+2}, \ldots, B_{(l-2)n+2}, B_{(l-1)n+2}$ of every data block of l piece each having n bits of the signal structure in FIG. 3A is converted in array to sequentially include the second data block $D_2$ of the data blocks forming the signal structure in FIG. 3B. Such an array converting operation (interleaving operation) is performed for all the bit data included in the signal structure in FIG. 3A in the same manner as described above.

In other words, n pieces of bit data $B_1, B_2, \ldots, B_{n-1}, B_n$ included in the first data block of the signal structure in FIG. 3A are interleaved to respectively correspond to the first bit positions $T_1, T_{l+1}, \ldots, T_{(n-2)l+1}, T_{(n-1)l+1}$ of the first to l-th new data blocks $D_1, D_2, \ldots, D_{l-1}, D_l$ of the signal structure in FIG. 3B. Similar interleaving process can be applied to the second or later data blocks of the signal structure in FIG. 3A.

Not only the information signal but also the address signal can be scattered while maintaining the interval corresponding to n bits and can be stored on the optical-disk 10 (in FIG. 1) by the execution of the above-described interleaving process.

Figure 3C:
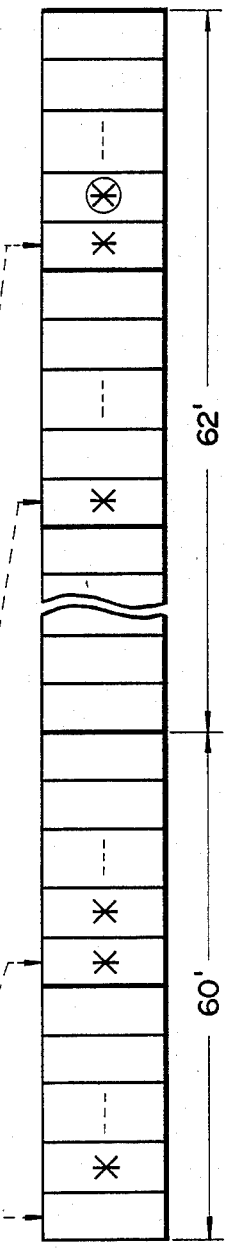

When the address signal and information signal thus interleaved and included in one sector as shown in FIG. 3B are deinterleaved by the deinterleave circuit 50 in the read mode, the signal structure shown in FIG. 3C is outputted from the deinterleave circuit 50. In this case, the data bit B is rearrayed to become similar to the original signal structure in FIG. 3A by the deinterleaving process, i.e., in the reverse sequence of the above-described interleaving process. The signal structure in FIG. 3C has a structure in which address signal fields 60' and information signal fields 62' are connected consecutively.

According to an optical-disk system of an embodiment of the present invention thus constructed, since the optical-disk 10 stores information in accordance with the CLV technique, the number of sectors formed on the surface data field in the vicinity of the peripheral edge of the disk 10 can be increased as compared with the constant angular velocity (CAV) control system. Accordingly, a large capacity of information can be stored in a high density format on the optical-disk system of the present invention.

Figure 4:
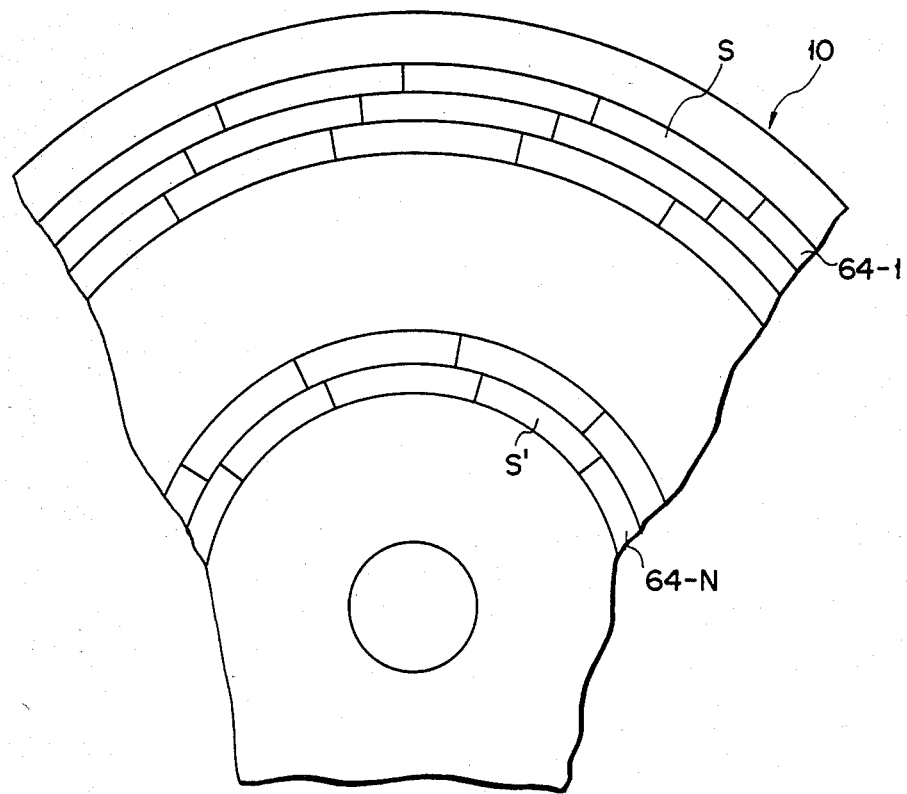
FIG. 4 is a view showing a sector pattern formed on the optical-disk rotating in accordance with a constant linear velocity (CLV) control.

FIG. 4 shows an array of sectors formed on the optical-disk 10 rotatably driven in accordance with the CLV control technique. The sector length of an arbitrary sector S formed in the track 64-1 in the vicinity of the outer peripheral edge of the disk 10 is substantially equal to the sector length of an arbitrary sector S' formed in the tracks 64-N in the vicinity of the center of the disk 10. Thus, the number of sectors formed on the disk 10 can be largely increased. On the other hand, the circular-arc angles of the sectors are different between the sectors S and S'. Accordingly, the starting position and ending position of the sector become irregular between the sectors included in the different track 64. As a result, the access error production rate becomes undesirably high when the desired sector is retrieved or accessed in the reproduction mode. However, access errors, including this problem, can be considerably reduced by the present invention. Because, according to the present invention, not only the information signal but also the address signal are interleaved, so that the improvement in accessing characteristics should sufficiently compensate for the increased amount of access errors due to irregular sector position.

More particularly, even if an undesired burst-shaped defect is produced on the optical-disk 10 and burst defects are concentrated at the position designated by an asterisk (*) in the address signal field 60 of the signal structure in FIG. 3B, the defects designated by "*" can be scattered by the deinterleaving process by the deinterleave circuit 50. Therefore, the number of error bits in the respective code words (n bits) are limited within the correcting capacity bit number (A), and the errors of the address signals can be completely corrected. Further, even if the number of the error bits is larger than the correcting capacity bit number (A), the error bits corresponding to the range of the correcting capacity bit number can be corrected, and most error bits in the address signals can be accordingly corrected. The error-correction of the address signal of this degree can be sufficiently practical for the purpose of sector access, and the accessing characteristics can be effectively improved in this manner. Therefore, the reproduction signal error occurrence rate can be suppressed, for example, at least to lower than $10^{-8}$ not only for the information but also for the address signal in the optical-disk having large burst-shaped defects and small random-shaped defects (marked by "*"), and a desired sector can be accessed readily at a high speed without complicated systematic correction.

For example, according to the inventor's experiments, when 2 bits are set for the correcting capacity A of the error correction code and the interleave length $l=32$ bits is set, the access error production rate of the reproduction signal in accordance with the present invention was less than $10^{-8}$ for the address signal and information signal combined. The access error production rate of $10^{-8}$ corresponds to less than once for each disk in the access error production number, when the optical-disk had 30 cm$\phi$ of the size of the optical disk and 2 $\mu$m of track pitch; it was thus recognized that the reliability of the access of the optical-disk of the present invention was very high from a practical standpoint.

Although the present invention has been shown and described with respect to a particular embodiment, various changes and modifications which are obvious to a person skilled in the art to which the invention pertains are deemed to lie within the spirit, scope, and contemplation of the invention.

Figure 5:
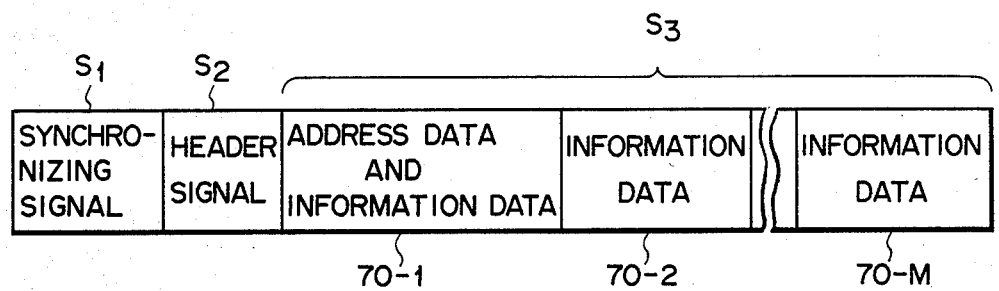
FIG. 5 is a view showing a model of the modified example of the sector data format in FIG. 2.

FIG. 5 shows a modified embodiment of a sector structure according to the present invention. In FIG. 5, the data field $S_3$ including the address signal and information signal of each sector is further divided into a plurality of segments. Thus, the above data field $S_3$ can be stored in the same manner as the above-described embodiment and includes a header segment 70-1 formed of a set of address signal and information signal. The segments 70-2, . . . , 70-M include only information signals error-correcting code encoded and interleaved. One period signal storing field $S_1$ and one header signal storing field $S_2$ are added to these plurality of segments 70 to form a sector. Substantially the same effects and advantages can be obtained as the above-described embodiments even if such sector structure is employed.

It is noted that, when the present invention employs as an encoding system only a parity bit or an error-detection code, or an error-correction code is not employed at all, the invention is also effective.

What we claim is:

1. An apparatus for storing information on a disk-shaped recording medium having a radition-sensitive layer and defining plural data storage sectors, comprising:
   (a) first circuit means for producing a digitally encoded information signal corresponding to said information;
   (b) second circuit means for producing an address signal which specifies an address in said recording medium of a respective sector in which said information signal is to be stored;
   (c) third circuit means connected to said first and second circuit means, for receiving said information signal and said address signal, and for commonly interleaving both said signals to produce an interleaved output signal to be commonly stored in said respective sector of said recording medium; and
   (d) fourth circuit means connected to said third circuit means, for modulating a write beam of energy incident to said radiation-sensitive layer of said recording medium in response to said interleaved output signal from said third circuit means so as to form on said radiation-sensitive layer said respective sector including said interleaved information address signals.

2. An apparatus according to claim 1, further comprising:
   fifth circuit means connected between said first and second circuit means, and said third circuit means, for encoding said information signal and said address signal using a predetermined error-correction technique and for adding predetermined bits of inspection bits to both said signals.

3. An apparatus according to claim 2, further comprising:
   sixth circuit means for receiving a reproduction signal optically read out in a sector from said recording medium and for demodulating said reproduction signal; and
   seventh circuit means connected to said sixth circuit means, for simultaneously deinterleaving both said information signal and said address signal included in the at least one sector thus read out.

4. An apparatus according to claim 3, further comprising:
   eighth circuit means connected to said seventh circuit means, for error-detecting and correcting said reproduced information signal and said reproduced address signal and for isolating said information signal and said address signal from each other.

5. An apparatus according to claim 4, further comprising:
   ninth circuit means connected to said fourth circuit means in parallel with said third circuit means, for supplying synchronizing signal and a header signal to said fourth circuit means at a predetermined, said synchronizing signal and said header signal being stored in said one sector formed on said recording medium.

6. An apparatus according to claim 5, wherein said at least one common sector comprises a first sector field including said synchronizing signal, a second sector field including said header signal, and a third sector field including both said information signal and said address signal simultaneously interleaved.

7. An apparatus according to claim 3, further comprising:
   head means provided in the vicinity of said rotating recording medium, for oscillating a laser beam modulated in response to said fourth circuit means and for converging said laser beam in a spot shape to be incident any said radiation-sensitive layer of said recording medium; and
   motor means for rotating said recording medium in accordance with constant linear velocity technique such that the relative velocity between said head means and said recording medium becomes substantially constant irrespective of the position above said recording medium of said head means.

8. An information-storing medium comprising:
   (a) a radiation-sensitive layer having a plurality of sectors for respectively storing a plurality of information units and address data for defining an address of the respective information unit, said sectors being formed by means of a write beam of radiation which is focused onto said layer, said information unit and said address data being commonly interleaved to form a common signal unit which is commonly stored in a predetermined sector field in a respective sector; and
   (b) a transparent substrate for supporting said radiation-sensitive layer, having a thickness larger than the thickness of the layer and allowing the transmission of at least said write beam of radiation.

9. An information-storing medium according to claim 8, wherein said medium is formed in a disk shape.

10. An information-storing medium according to claim 8, wherein said radiation-sensitive layer defines a plurality of substantially concentrically circular tracks, and said sectors are included in each of said tracks to be substantially adjacent to each other.

11. An information-storing medium according to claim 10, wherein the sector length of sectors included in the tracks adjacent to the peripheral edge of said medium in said tracks is substantially equal to the sector length of the sectors included in the tracks adjacent to the center of said medium in said tracks.

12. An information-storing medium according to claim 11, wherein each of said sectors comprises a sector field for independently storing a synchronizing signal and a sector field for independently storing a header signal.

13. An information-storing medium according to claim 12, comprising:
   a protection layer provided on said radiation-sensitive layer for isolating said radiation-sensitive layer from outer atmosphere.

14. A method for storing information on a disk-shaped recording medium having a radiation-sensitive layer and defining plural data storage sectors, comprising:
   producing a digitally encoded information signal corresponding to said information;
   producing an address signal which specifies an address in said recording medium of a sector where said information signal is to be stored;
   commonly interleaving both said information and address signals to produce an interleaved output signal; and
   modulating a write beam of energy incident to said radiation-sensitive layer of said recording medium in response to said interleaved output signal to form on said radiation-sensitive layer at least one sector including said commonly interleaved information and address signals.

15. A method according to claim 14, further comprising:
   encoding said information signal and said address signal on the basis of a predetermined error-correction technique and adding predetermined bits of inspection bits to both said signals prior to said interleaving step.

16. An apparatus according to claim 15, further comprising:
   optically reading out a reproduction signal from said at least one sector of said recording medium;
   demodulating said reproduction signal; and
   deinterleaving both said information signal and said address signal stored in said common sector.

17. A method according to claim 16, further comprising:
   error-detecting and correcting said deinterleaved information signal and said reproduced address signal.

18. An apparatus according to claim 17, further comprising:
   supplying a synchronizing signal and a header signal prior to said interleaving steps; and
   storing said synchronizing signal and said header signal in said at least one sector.

19. A method according to claim 14, wherein said modulating step comprises:
   providing a head including a laser which produces a laser beam and modulating said laser beam in response to said interleaved output signal;
   converging said laser beam in a spot shape to be incident on said radiation sensitive layer of said recording medium; and
   rotating said recording medium such that the relative velocity between said head and said recording medium becomes substantially constant irrespective of the position above said recording medium of said head.

* * * * *